United States Patent [19]

Weimer

[11] B 3,919,468

[45] Nov. 11, 1975

[54] CHARGE TRANSFER CIRCUITS

[75] Inventor: Paul Kessler Weimer, Princeton, N.J.

[73] Assignee: RCA Corporation, New York, N.Y.

[22] Filed: Nov. 27, 1972

[21] Appl. No.: 309,755

[44] Published under the Trial Voluntary Protest Program on January 28, 1975 as document no. B 309,755.

[52] U.S. Cl............. 178/7.1; 250/211 J; 307/221 D

[51] Int. Cl.$^2$.......................................... H04N 3/14

[58] Field of Search............ 178/7.1, 7.3 R, DIG. 3; 250/220 M, 211 R, 211 J; 340/146.3 MA, 146.3 H

[56] References Cited

UNITED STATES PATENTS 3,597,731 8/1971 Reitboeck et al........... 340/146.3 H 3,701,095 10/1972 Yamaguchi et al. ..... 340/146.3 MA 3,746,883 7/1973 Kovac........................... 307/221 D

*Primary Examiner*—Howard W. Britton

*Assistant Examiner*—Michael A. Masinick

*Attorney, Agent, or Firm*—H. Christoffersen; Samuel Cohen

[57] ABSTRACT

Apparatus to increase signal-to-noise ratio of output signals from a charge transfer circuit. Video signals from a charge transfer image sensor array are increased in amplitude by combining light responsive charges of selected sensor elements. Circuitry is arranged to provide summation of signals from, for example, adjacent sensor array elements.

9 Claims, 13 Drawing Figures

CHARGE TRANSFER CIRCUITS

The invention herein described was made in the course of or under a contract or subcontract thereunder with the Department of the Navy.

This invention relates to signal transfer systems associated with image sensing and storage apparatus, the systems including charge transfer sensor arrays and/or storage registers.

In a charge transfer array of light sensors, noise produced as information is transferred within the sensor array and peripheral circuitry decreases the signal-to-noise ratio of signals obtained therefrom. This noise is derived from a combination of factors such as the statistical fluctuation of photons in the sensor elements, fluctuations in the size of charge packets, switching transients introduced by the charge transfer process, and noise associated with the input circuitry of a following video amplifier. Application of low incident scene illumination to the sensor array subject to these noise conditions may produce undesirably noisy output signals in which the video information is essentially lost.

Another situation in which video information is lost involves scenes of high contrast. In the dark areas of these scenes, video information may be of sufficiently low levels that it is completely lost in the noise introduced in processing of the signals.

Previously, in order to recover low-level video signals from the noise produced in the system, low pass frequency selective filters have been utilized. A low pass filter will operatively remove high frequency noise from the video signal while reducing resolution at the same time. The high frequency noise removal, however, only removes part of the totally produced noise.

A preferred means for reducing the effects of system noise upon video signals and for improving recovery of low light level signals is provided in a signal-transfer system embodying the invention. Such a system comprises a photosensitive array, the elements of which include means for providing and storing electrical charge in response to light stimuli. A combining means is coupled to the charge storage means therein providing addition of a predetermined number of signals from selected adjacent array elements and forming a single combined signal representative of the sum of the predetermined number of signals. A source of control signals is coupled to the combining means and provides signals for selecting those array elements from which signals are to be combined. Storage means also may be provided for storing and/or further combining signals. Readout means are coupled to the combining means so that readout of uncombined and/or selectively combined signals is provided.

A better understanding of the invention may be obtained from the following description which is given with reference to the accompanying drawings, of which:

Figure 1:
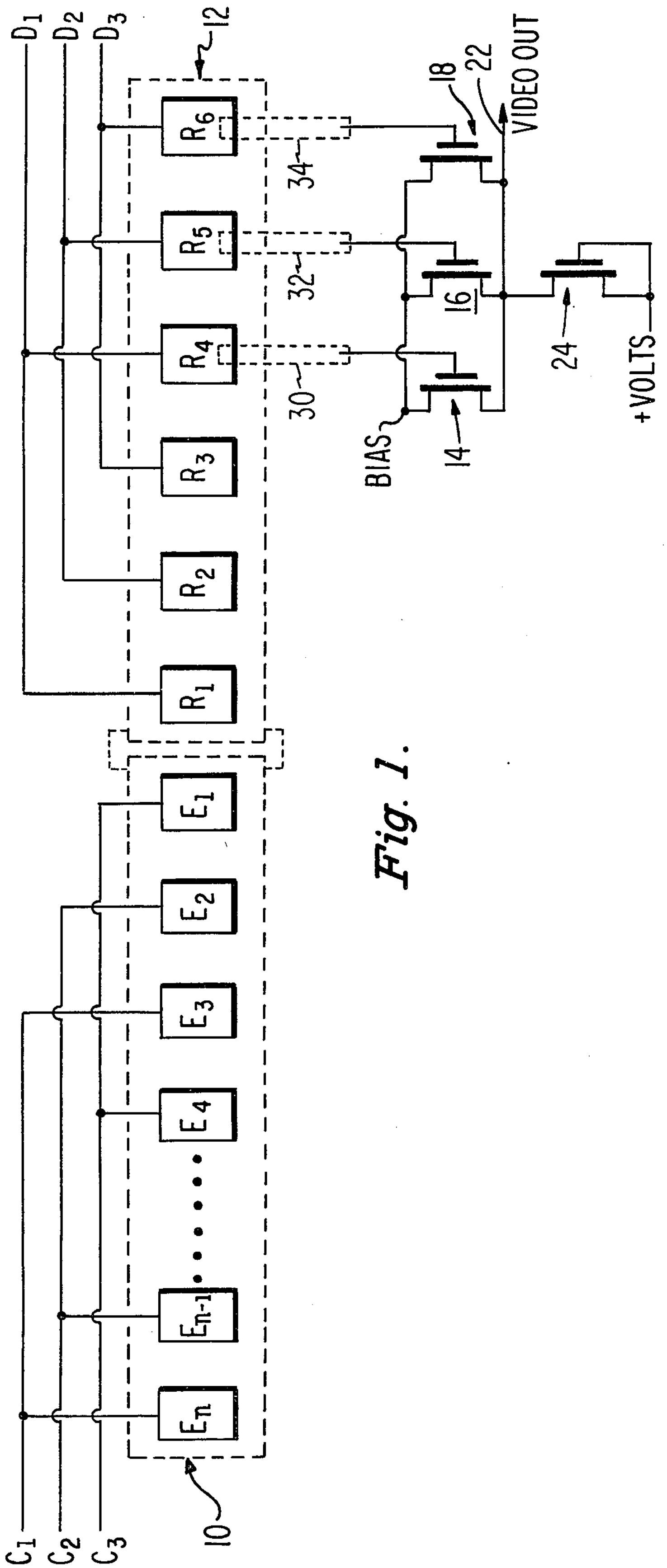
FIG. 1 is a schematic representation of a charge coupled sensor array with associated register and output circuitry embodying the invention.

The image sensing system embodying the invention illustrated in FIG. 1 comprises an array 10 of "$n$" charge coupled light sensor regions $E_1$, $E_2$, . . . $E_n$ coupled to a charge coupled output register 12 including electrodes $R_1$ through $R_6$. Signal readout circuitry, including transistors 14, 16, 18 and 24, is coupled to register 12 to provide video output signals at an output terminal 22. The illustrated circuitry of FIG. 1, as will be explained below, is capable of producing a summation of signals from adjacent sensor array elements, thereby providing increased amplitude video output signals.

Figure 2:
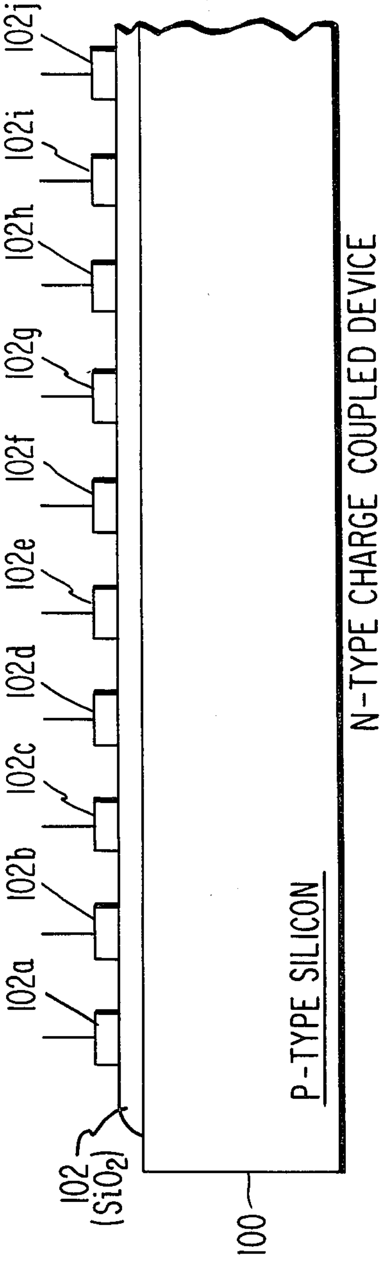
FIG. 2 is a partial sectional view of a charge coupled device which may be used either as a sensor or a register in the manner shown in FIG. 1.

FIG. 2 is a partial sectional view illustrating the general structure of a charge coupled array such as the light sensor 10 or the register 12 of FIG. 1. Charge coupled arrays are typically constructed on a single semiconductor substrate 100 formed, for example, of uniformly doped P-type silicon. In such an array, a thin layer of insulating material 102 such as silicon dioxide ($SiO_2$) is formed on the substrate 100 and serves to insulate a series of conducting electrodes 102*a*, 102*b*, 102*c* . . . from the substrate 100. These conducting electrodes 102*a*, etc. are made of material such as aluminum or polycrystalline silicon and are regularly spaced along substrate 100.

In a typical use of the charge coupled device of FIG. 2 as a light sensor (such as sensor 10 of FIG. 1), potential wells are formed under selected ones of the electrodes (102*a*, 102*b*, 102*c*, etc.) by applying a source of direct energizing voltage between the substrate 100 and the the selected electrodes (e.g., 102*a*). The selected electrodes are made positive with respect to the P-type substrate 100. Application of positive energizing voltage tends to deplete majority (positive) carriers from the region of substrate 100 below the selected electrode, thereby creating a so-called potential well.

Light representative of a scene is focussed by means of a lens (not shown) to form an image in the substrate 100 close to the $SiO_2$ interface. The light may approach this interface through the insulating layer 102 between the electrodes 102*a*, 102*b*, 102*c*, etc. or it may reach this region by passing through the substrate 100 from the reverse side. The effect of the light is to impart photon energy to substrate 100, thereby raising electrons (minority carriers) from a valance energy band into a conduction energy band. The added energy causes the number of active minority carriers in substrate 100 to increase in proportion to the intensity of impinging light. These minority carriers are thereafter attracted to the potential well areas within the substrate 100.

Electrons or minority carriers that have been attracted into these potential wells may thereafter be shifted through the substrate by shifting the position of the potential wells. For example, the potential well formed under electrode 102*a* may be shifted to a position under electrode 102*b* by reducing the potential between electrode 102*a* and the substrate 100 and placing the energizing potential on electrode 102*b*. By successively shifting the energizing potential from electrode to electrode through sensor 10, the potential well originally formed under electrode 102*a* may be shifted through the sensor towards an output terminal.

Figure 5:
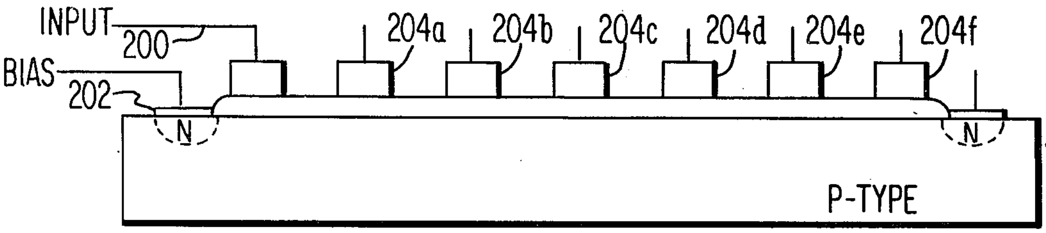
FIG. 5 is a partial detailed drawing of a charge coupled register suitable for use in the system shown in FIG. 1.

A charge coupled sensor of the type described may be coupled to a charge coupled register either by constructing the register on the same substrate as, and adjacent to, the sensor in a position to directly couple charge from one to the other, or by providing an output terminal on the sensor array and externally coupling such output terminal to an input terminal on the charge coupled register. In either case, construction of the charge coupled register is physically similar to the charge coupled sensor array. A distinction does exist, however, between the sensor array and the register when the sensor is externally coupled to the register. In that case, it is advantageous to supply a source of minority carriers to the substrate material of the register in the manner shown in FIG. 5. In that figure, an input electrode 200 is located adjacent to both a reverse biased junction 202 and a succession of electrodes (204*a*, 204*b*. . . . ) similar to those in the charge coupled sensor shown in FIG. 2.

The junction 202 may be formed with a small amount of semiconductor material, opposite in conductivity type to that use for the substrate. For example, N-type material would be used with a P-type substrate. The junction 202 is reverse biased and provides the desired source of minority carriers suitable for this application. The existence of additional minority carriers from this source facilitates the collection of these carriers in a potential well under the input electrode 200 of the register and provides a more readily available quantity of minority carriers in response to an input signal. Application of an input signal to the input electrode 200 attracts minority carriers from reverse biased junction 202 to a position under electrode 200. These minority carriers may then be shifted sequentially towards an output terminal in the same manner as was described above for shifting carriers in charge coupled sensor array 10 of FIG. 1.

Figure 3:
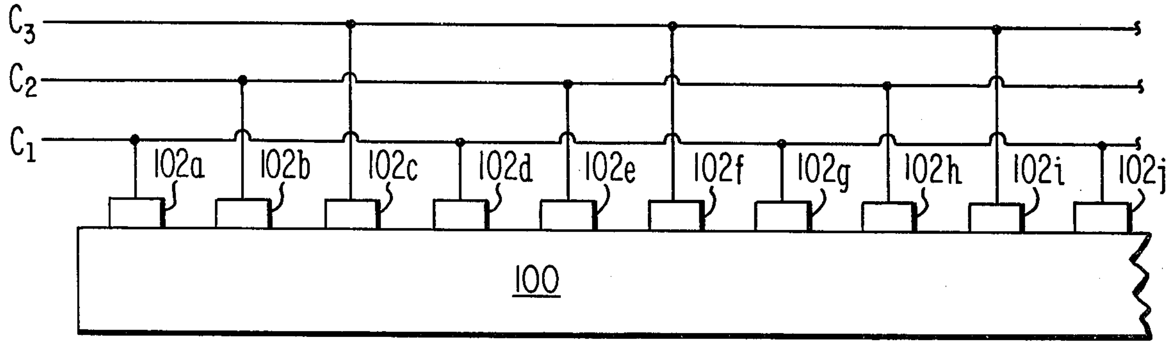
FIG. 3 is a partial detailed schematic representation of a portion of a three-phase charge coupled sensor suitable for use in the arrangement shown in FIG. 1.
Figure 4:
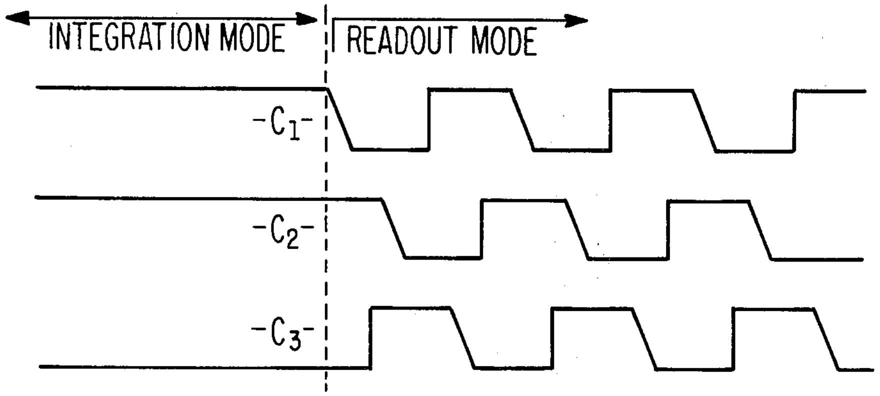
FIG. 4 illustrates waveforms utilized in the three-phase charge coupled apparatus of FIGS. 1, 2 and 3.

As was stated previously, the sensor array 10 may be fabricated in the manner shown in FIG. 2. In addition, appropriate energizing potentials are coupled to the electrodes 102*a*, 102*b*, 102*c*, etc. in the manner shown, for example, in FIG. 3. In FIG. 3, the electrodes are arranged in groups such that each group of three successive electrodes forms a single sensor element. Three separate clock lines $C_1$, $C_2$, and $C_3$ are coupled to corresponding electrodes of each of the individual elements of the sensor array 10. That is, the first clock line $C_1$ is coupled to the first electrodes (102*a*, 102*d*, 102*g*, etc.) of each successive group of three electrodes. The second clock line $C_2$ is coupled to the second electrodes (102*b*, 102*e*, 102*h*, etc.) of each successive group of three electrodes and the third clock line $C_3$ is coupled to the third electrodes (102*c*, 102*f*, 102*i*, etc.) of each successive group of three electrodes. Potentials are applied to these clock lines $C_1$, $C_2$ and $C_3$ to operate sensor array 10 in two modes, an integration mode and a readout mode. In the integration mode, a potential well is created within each sensor element by applying a bias voltage (for example +10 volts) between substrate 100 and each of the first and second clock lines $C_1$ and $C_2$ (see FIG. 4). Potential wells positioned in substrate 100 are then shared between first and second electrodes of each group of three successive electrodes, for example, under electrodes 102*a*, 102*b*, 102*d*, 102*e*, etc. Only first and second electrodes of the sensor elements are energized during the integration mode so that physical spaces (primarily associated with each third electrode) will exist between the adjacent wells. This spacing is necessary in order to maintain the integrity or separate nature of the potential wells during each of the integration and readout modes. Minority carriers released in the substrate 100 in response to light stimuli will be stored in these potential wells. Since during the integration mode, the clock line $C_3$ is not supplied with the required energizing voltage, no charge is accumulated under the associated electrodes. The stored charge in each well will provide an analog representation of the corresponding portions of the scene. During the readout mode, the varying portions of the waveforms illustrated in FIG. 4 are applied to respective clock lines $C_1$, $C_2$ and $C_3$ of sensor array 10 and provide a means to serially shift the stored information to an output terminal or charge coupled register (such as register 12 of FIG. 1). The readout mode will be described in connection with FIG. 6, which also illustrates the waveforms ($D_1$, $D_2$, $D_3$) utilized for combining signals from elements of sensor array 10 and for transferring such signals in register 12.

In the apparatus of FIG. 1, application of the timing waves $D_1$, $D_2$ and $D_3$ (FIG. 6) to respective clock lines $D_1$, $D_2$ and $D_3$ on register 12, and application of timing waves $C_1$, $C_2$ and $C_3$ (FIG. 6) to respective clock lines $C_1$, $C_2$ and $C_3$ on sensor array 10 provides signals for the summation of minority carriers associated with three successive elements of sensor array 10 (nine successive electrodes). The particular number of sensor array elements from which minority carriers are combined is determined by selecting the clock timing waves (FIG. 6) applied to sensor array 10 and to register 12.

Figure 6:
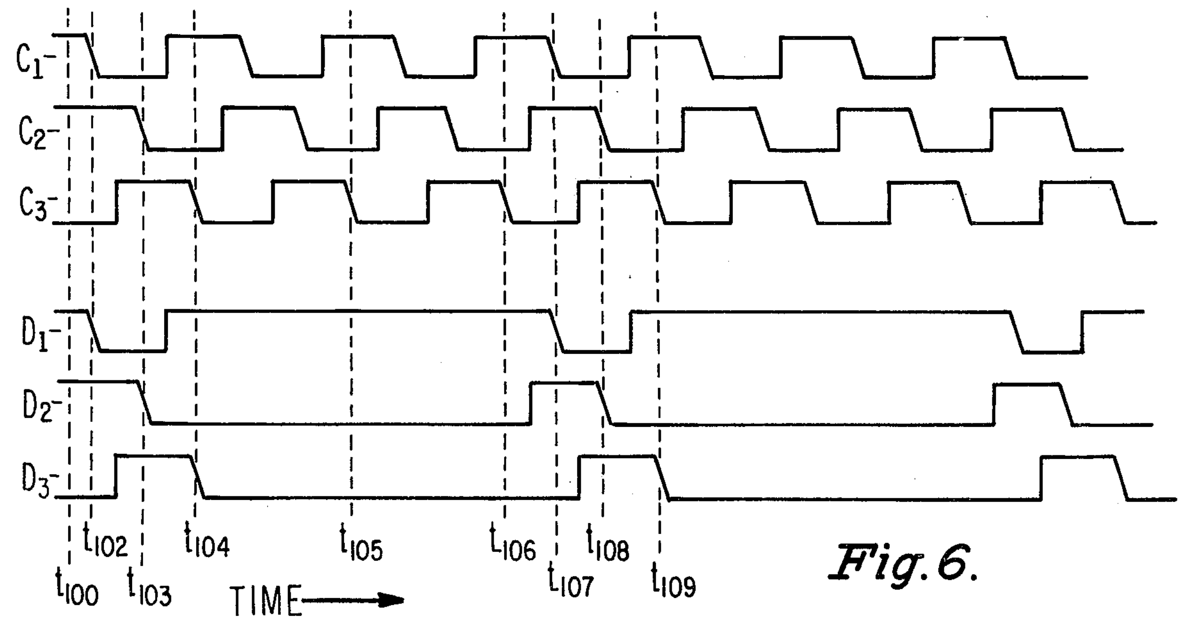
FIG. 6 illustrates timing or clock signals for the charge coupled arrangement of FIG. 1.

In operation, light from a scene impinges on the sensor array 10 in the manner previously described. As is shown in FIG. 6, at time $t_{100}$, (the end of the integration mode), timing waves $C_1$ and $C_2$ are at their greatest positive potential, such that sensor array electrodes $E_3$ and $E_2$ (as well as each other similarly energized pairs of electrodes) of FIG. 1 create a common potential well in substrate 100 to store and share light responsive minority carriers therein. During the interval $t_{100}$ to $t_{102}$, as timing wave $C_1$ decreases in a finite time to its minimum value, minority carriers previously shared under electrodes $E_3$ and $E_2$ are shifted to a position under only electrode $E_2$. Similarly, at time $t_{103}$, while timing wave $C_3$ is at its greatest positive potential, timing wave $C_2$ is decreasing towards a minimum value, effecting a shift of the minority carriers from under electrode $E_2$ to under electrode $E_1$. At $t_{104}$, the carriers under electrode $E_1$ are shifted to a position under electrode $R_1$ of register 12. Thus, as successive portions of the clock signals $C_1$, $C_2$ and $C_3$ occur, minority carriers previously associated with the electrodes $E_3$, $E_2$ and $E_1$ of sensor array 10 are serially shifted through the array and into a position under electrode $R_1$ of register 12.

Register 12 in FIG. 1 is charge coupled to sensor array 10 and is capable of shifting minority carriers in the same manner as sensor array 10. The clock signals $D_1$, $D_2$, $D_3$ associated with register 12 are arranged to produce one-third the transitions associated with clock signals $C_1$, $C_2$, $C_3$ and sensor array 10. Thus, the quantity of minority carriers shifted from $E_1$ to $R_1$ at $t_{104}$ remains associated with $R_1$ for two more intervals $t_{105}$ and $t_{106}$, during which time additional minority carriers associated with two successive groups of three sensor electrodes (two sensor elements) are accumulated with the first group of carriers under $R_1$. At time $t_{107}$, when clock $D_2$ is high and $D_1$ decreases towards a minimum, the minority carriers accumulated under $R_1$ are shifted to $R_2$. Shortly thereafter at time $t_{108}$, minority carriers in $R_2$ are shifted to $R_3$ and a short interval later at $t_{109}$, such carriers are shifted to $R_4$. The process described above is repeated, successively shifting accumulated groups of minority carriers through register 12. The resultant signals are read out from register 12 by means of the following apparatus. Diffused electrodes 30, 32 and 34, shown dotted in FIG. 1 are located partially under respective register electrodes $R_4$, $R_5$ and $R_6$ and are coupled to respective gate electrodes of output circuit transistors 14, 16, and 18. As will be explained below, surface potentials produced at these register electrodes $R_4$, $R_5$ and $R_6$ in response to minority carriers thereunder control the conduction of transistors 14, 16 and 18 and thereby provide output signals at terminal 22.

Figures 7, 8:
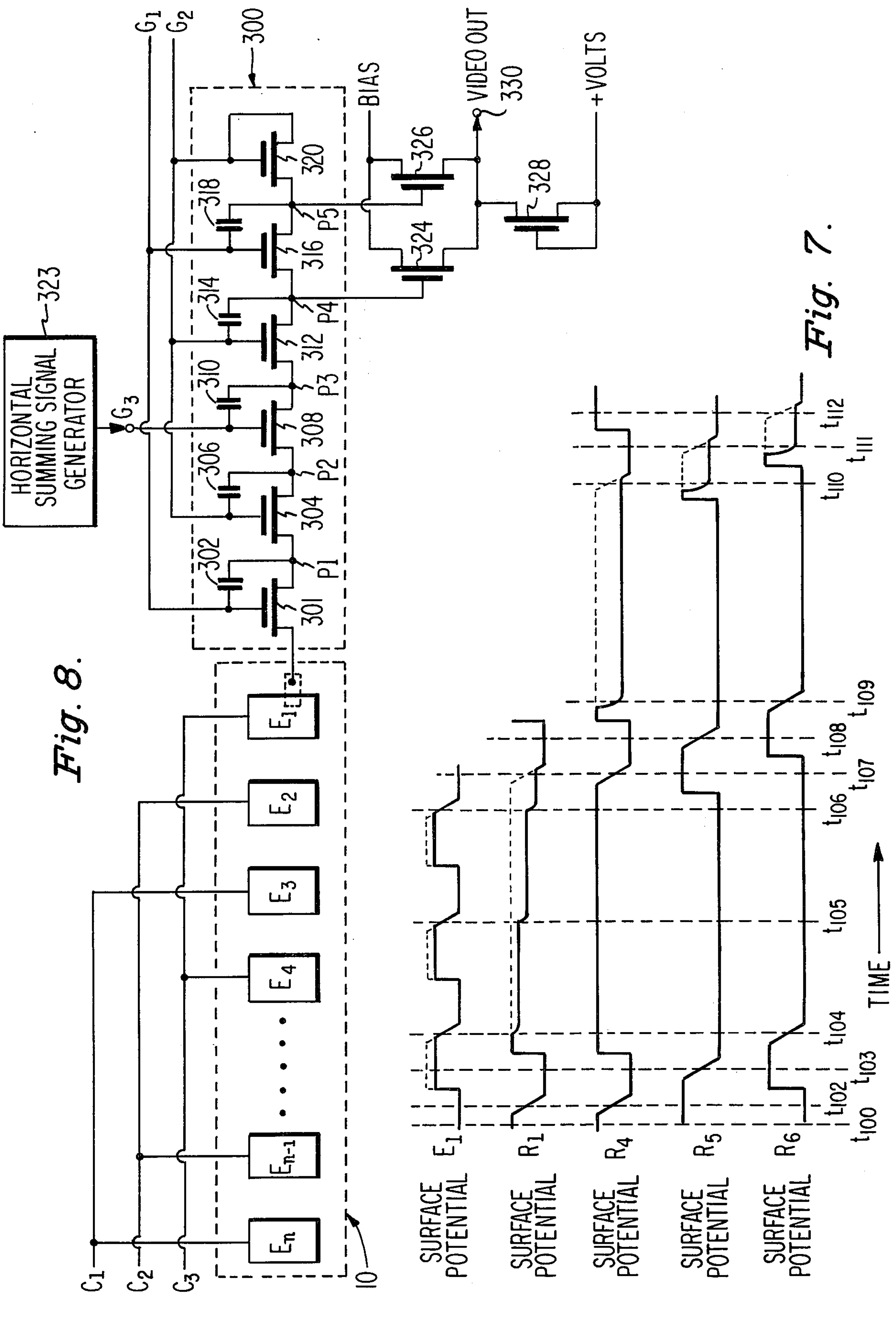
FIG. 7 illustrates typical electrode surface potentials during a summation process in the charge coupled register of FIG. 1.
FIG. 8 is a block and schematic drawing of a charge coupled sensor and a bucket brigade register embodying the invention.

The surface potentials associated with electrodes in each of sensor array 10 and register 12 of FIG. 1 are illustrated in FIG. 7. These surface potentials are responsive to the quantity of minority carriers under a particular electrode during a given instant of time and are depicted in FIG. 7 as the potentials might appear during a charge transfer process such as was described above in connection with FIGS. 1 and 6. For example, the surface potential associated with electrode $E_1$ is shown in FIG. 7. As minority carriers from preceding elements are shifted into the potential well formed under electrode $E_1$, the associated surface potential decreases from the dotted line to the solid line (i.e., the dotted line in the potential waveform depicts the potential of electrode $E_1$ in the absence of minority carriers). The successive decreases in the potential $E_1$ are depicted as being small in amplitude in correspondence with a low incident light level upon sensor array 10. When the charge associated with electrode $E_1$ is shifted to a position under electrode $R_1$ of register 12, the surface potential of $R_1$ becomes approximately the same magnitude as that of $E_1$ just prior to the shift (e.g., at time $t_{104}$ of FIG. 7). At time $t_{105}$, additional minority carriers that have since been shifted under $E_1$ are now shifted under $R_1$, decreasing the surface potential of $R_1$ by a total amount corresponding to the accumulated minority carriers shifted under $R_1$ at times $t_{104}$ and $t_{105}$. Similarly, at time $t_{106}$ minority carriers then under $E_1$ are again shifted under electrode $R_1$ increasing the quantity of minority carriers thereunder and decreasing its associated surface potential. Accumulated minority carriers under $R_1$ are successively shifted through register 12 to electrodes $R_2$, $R_3$, etc. by the application of clock signals $D_1$, $D_2$ and $D_3$. At time $t_{109}$, minority carriers associated with $R_3$ are shifted to $R_4$ producing a surface potential corresponding to the accumulation of minority carriers from three successive sensor elements of array 10. Substantially the same quantity of minority carriers is shifted to $R_5$ at $t_{110}$ and similarly to $R_6$ at $t_{111}$ where it remains until again shifted out at $t_{112}$. Hence, substantially the same surface potential appearing on electrode $R_4$ appears on $R_5$ and $R_6$ during the interval $t_{109}$ through $t_{112}$. This total time $t_{109}$ through $t_{112}$ correponds to three transfer periods of the clock waveforms ($C_1$, $C_2$, or $C_3$) applied to sensor array 10.

The video signals accumulated in register 12 are extracted by means of transistors 14, 16, 18 and 24. Transistors 14, 16 and 18 have source electrodes coupled in common to a source of bias voltage and drain electrodes coupled in common to a video output terminal 22. The source-drain path of a diode-connected load transistor 24 is coupled to the joined drains of transistors 14, 16 and 18. The gate and drain of transistor 24 are coupled in common to a source of positive supply voltage. Gate electrodes of transistors 14, 16 and 18 are coupled to diffused electrodes 30, 32 and 34 under respective electrodes $R_4$, $R_5$ and $R_6$ of register 12. This combination of transistors 14, 16, 18 and 24 function to provide at terminal 22 an output signal representative of the sum of the applied input signal. Hence, when signal-representative charge is transferred to a position under electrodes $R_4$, $R_5$ or $R_6$, a respective change in surface potential occurs causing a change in the quiescent potentials on diffused regions 30, 32 or 34. These changes in quiescent potentials cause a change of current flow in transistors 14, 16 or 18 as the case may be, thereby creating a modulated output signal on terminal 22. Successive conduction in transistors 14, 16 and 18, in response to the charge transferred under electrodes $R_4$, $R_5$ and $R_6$, provides output signals on terminal 22 of substantially constant amplitude for three intervals of a clock signal (e.g., $C_1$ of FIG. 6). This single output signal for three clock intervals is representative of the sum of the three individual signals that would have been produced at terminal 22 in the absence of summing. To effect an absence of signal summing, clock signals $D_1$, $D_2$ and $D_3$ of FIG. 6 are made identical to respective clock signals $C_1$, $C_2$ and $C_3$. To effect summation of signals from a number of elements of sensor array 10 other than three as illustrated, the clock signals $D_1$, $D_2$ and $D_3$ would be altered with respect to the sensor clock signals $C_1$, $C_2$, and $C_3$. For example, increasing the period of the clock signals to register 12 so as to include four of the clock intervals associated with sensor array 10 creates an output signal at terminal 22 representative of the summation of signals from four sensor elements. The above-described output circuit is the subject matter of a copending U.S. application Ser. No. 186,078, now U.S. Pat. No. 3,746,883 entitled CHARGE TRANSFER CIRCUITS, in the name of Michael George Kovac, and also assigned to the RCA Corporation.

FIG. 8 illustrates a charge coupled sensor array 10 coupled to a bucket brigade register 300 wherein summation of successive output signals from the sensor may be provided. In such an arrangement, signals from sensor array 10 are direct coupled to register 300, providing a direct signal to the source electrode of transistor 301. Transistor 301 is the first of a series of transistors (301, 304, 308, 312, 316 and 320) coupled together to form register 300. These six transistors are arranged such that the respective drain electrodes of transistors 301, 308, and 316 are coupled to respective source electrodes of transistors 304, 312 and 316. Storage capacitors 302, 306, 310, 314, and 318 are coupled, respectively, between the gate and drain electrodes of transistors 301, 304, 308, 312 and 316. These capacitors store charges which are successively transferred in response to signals from sensor array 10. The gate electrode of transistor 320 is direct coupled to its drain electrode and provides a path for removal of minority carriers shifted through register 300.

The charge carriers in the bucket brigade register 300 may be shifted in a similar fashion to the shift sequence of the charge coupled register in FIG. 1. Two clock lines $G_1$ and $G_2$ are required for this shifting process. The first clock line $G_1$ is coupled to the gate electrodes of transistors 301 and 316 while the second clock line $G_2$ is coupled to the gate electrode of transistors 304, 312 and 320. The gate electrode of transistor 308 is not coupled to a clock line, but rather to a summing signal generator 323. In this configuration, transistor 308 functions as a signal summing stage for register 300. Summing signal generator 323 provides a wavetrain $G_3$ which is in phase with the clock wavetrain $G_1$ (see FIG. 10) but is adjustable in frequency to provide either no summation of signals or summation of any predetermined number of successive signals.

Figure 9:
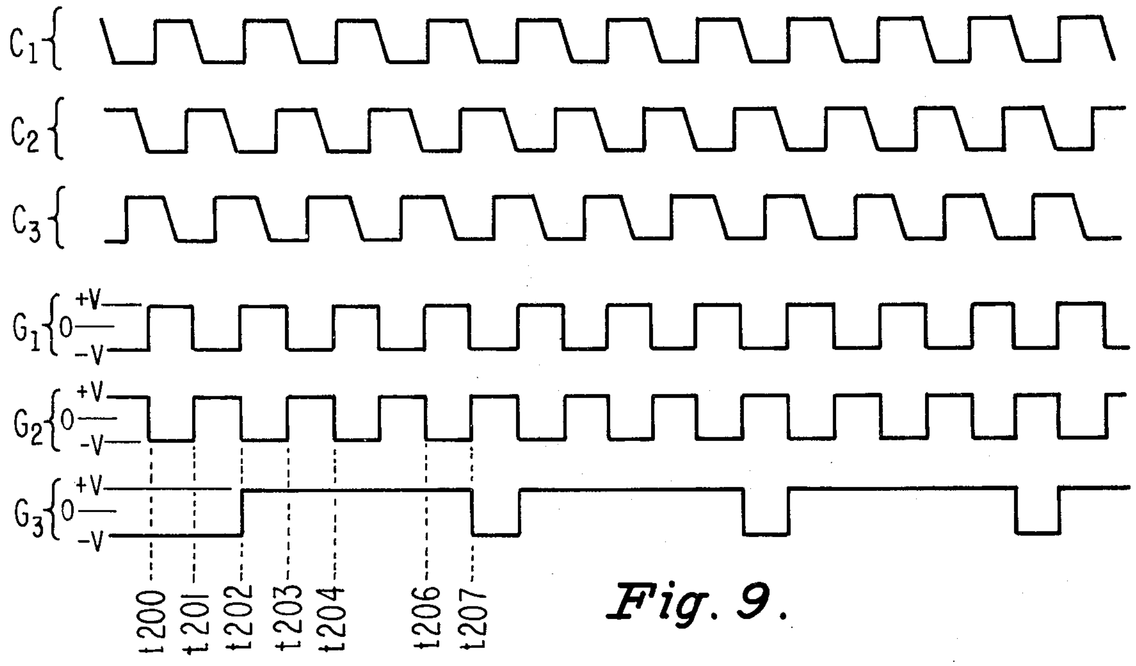
FIG. 9 illustrates timing or clock signals associated with circuitry of FIG. 8.
Figure 11:
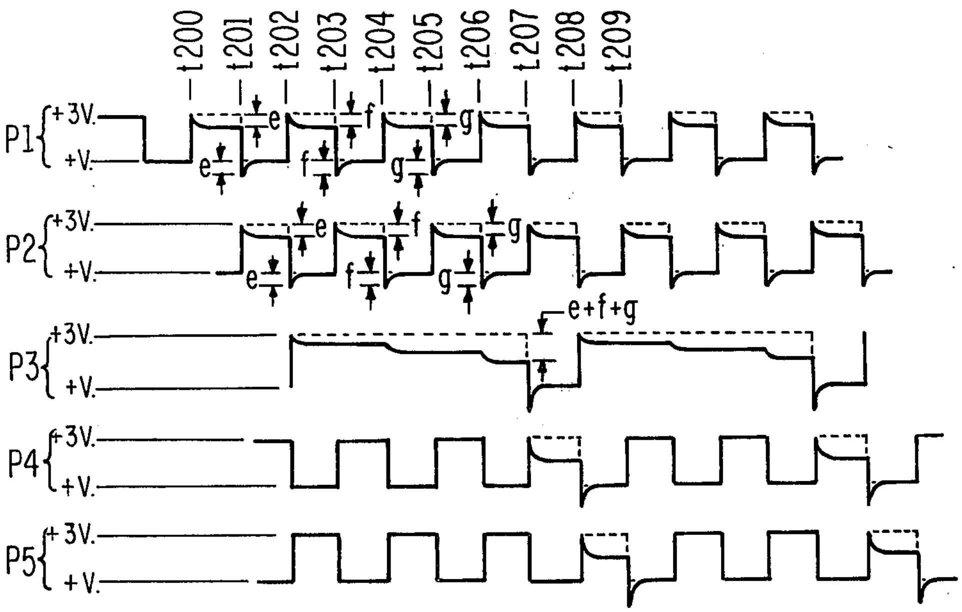
FIG. 11 illustrates node potentials of FIG. 8 circuitry in response to input signals.

The charge transfer process of bucket brigade register 300 may be better understood by first considering the transfer process of signals through this register in the absence of signal addition. Input signals representative of the charge in element $E_1$ of sensor array 10 are applied to the source electrode of transistor 301. Referring to FIG. 9, at time $t_{200}$ the clock signal applied to clock line $G_1$ changes from −V volts to +V volts turning on transistor 301. Current flows in the drain-source path of transistor 301 until the potential difference between source and gate electrodes is substantially zero. Referring to FIG. 11, this conduction results in a decrease of the voltage at node P1 (the drain of transistor 301) by, for example, an increment of "*e*" volts in response to an input signal of substantially the same magnitude. At time $t_{201}$ the clock signal $G_1$ changes from +V volts to −V volts while the clock signal $G_2$ applied to the gate electrode of transistor 304 changes from −V volts to +V volts. This latter signal reduces the potential at node P1 to a level of (+V−*e*) volts which is e volts lower than the signal applied to the gate electrode of transistor 304. The drain electrode of transistor 304 is at +3V volts and conduction in transistor 304 occurs from drain to source until the potential at node P1 is substantially equal to potential applied to the gate electrode of transistor 304. This conduction process results in a reduction of the potential at node P2 by approximately *e* volts and restoration of the potential at node P1 to approximately +V volts. In this manner, a signal, for example *e* volts, representative of the minority carriers under electrode $E_1$, may be transferred through register 300. This signal transfer process is known as bucket brigade charge transfer.

In the presence of weak video signals from sensor array 10, it may be desirable to sum signals from adjacent sensor elements and thereby produce output signals with a higher signal-to-noise ratio at the expense of resolution.

FIG. 9 illustrates wavetrains suitable for providing a summation in register 300 of video signals from three successive elements of sensor array 10. Clock signals $C_1$, $C_2$ and $C_3$ (similar to corresponding wavetrains in FIG. 6) provide a sequential shift of video information in the charge coupled sensor array 10 to an output terminal. Clock signals $G_1$, $G_2$ , and $G_3$ are timed relative to clock signals $C_1$, $C_2$ and $C_3$ to transfer charge in the bucket brigade register 300 synchronous with the charge transfer in sensor array 10. In addition, clock signal $G_3$ has been adjusted to provide summation of charge that has been shifted into register 300 from each of three successive elements of sensor array 10. Application of this clock signal $G_3$ from the horizontal summing signal generator 323 to the clock line $G_3$ applies a +V potential to the gate electrode of transistor 308 for the period of time from $t_{202}$ to $t_{207}$ as shown in FIG. 9. During this period of time, three successive conduction cycles of transistor 308 occur in response to input signals at times $t_{202}$, $t_{204}$, and $t_{206}$. These successive conduction cycles lower the potential at node P3 by an amount corresponding to the sum of three successive charge transferred signals. This summation process may be better understood with the aid of the following detailed explanation and reference to FIGS. 8, 9 and 11. Video representative signals are transferred within sensor array 10 and to register 300 by application of clock signals $C_1$, $C_2$ and $C_3$. Furthermore, such video signals are transferred and summed in register 300 by means of clock signals $G_1$, $G_2$ and $G_3$. Specifically, at time $t_{200}$, the first of a series of such video signals, (for example "*e*" volts) is transferred to register 300 from sensor array 10. The potential at node P1 is thereby lowered from a level of +3V volts to −3V−e volts as shown in FIG. 11 during the interval of $t_{200}$ to $t_{201}$. Transfer of this signal succeeding register stages is then provided by sequentially causing conduction in the successive stages.

At time $t_{201}$, the clock signal $G_1$ decreases, lowering the potential at node P1 to +V volts minus the transferred signal potential, *e* volts. This places the source electrode of transistor 304 e volts below the +V volts on its gate electrode. Concurrently, at time $t_{201}$, the drain electrode of transistor 304 is at +3V volts. With the noted potentials on the source, drain and gate electrodes of transistor 304, conduction in transistor 304 occurs. Positive charge is shifted from capacitor 306 to capacitor 302 until the potential at node P1 is substantially equal to that on the gate electrode (+V volts) of transistor 304. A steady state condition follows in which the potential at node P2 remains depressed by approximately *e* volts (until time $t_{202}$).

At $t_{202}$, the clock signal $G_2$ decreases, lowering the potential on node P2 to +V volts minus the transferred signal (*e* volts), thereby placing the source electrode of transistor 308 at a potential of (V−*e*) volts. The clock signal $G_3$ (+V) is concurrently applied to the gate electrode of transistor 308 for an interval equal to the time required for three signal transfers from the preceding stage (transistor 304). This elongated clock interval of waveform $G_3$ allows three successive charge transfers to cumulatively effect the charge storage in capacitor 300. The clock signal $G_3$ raises the gate potential on transistor 308 to +V volts and also raises the drain potential of this transistor to +3V volts. Transistor 308 is thereby forward biased and transfers positive charge from capacitor 310 to capacitor 306. Successively, and in the same manner as the transfer of the $e$ volt signal, signals of $f$ volts and $g$ volts are transferred through register 300. Signals $f$ and $g$, at times $t_{204}$ and $t_{206}$, respectively cause positive charge to be transferred from capacitor 310 to capacitor 306, cumulatively lowering the potential on node P3. As a result, the potential at node P3 at time $t_{207}$ is $(3V=e=f-g)$ volts. The accumulated potential representative of $e$, $f$, $g$ may now be transferred to succeeding register capacitors 314 and 318 in a manner similar to that used on the preceding transfers. Hence, at time $t_{207}$ when the clock signal applied to clock line $G_3$ becomes $-V$ volts, the potential on node P3 shifts to $(+V-e-f-g)$ volts, providing the source electrode of transistor 312 with a voltage of $e+f+g$ volts lower than the $+V$ clock voltage concurrently applied to the gate electrode. This forward biases transistor 312 and causes current to flow from drain electrode to source electrode, reducing the stored charge on capacitor 314 until the potential at node P4 is reduced from $+3V$ volts to approximately $(3V-e-f-g)$ volts. In a similar fashion, at time $t_{208}$ this same potential $(3V-e-f-g)$ volts is made to appear on node P5.

Thus far it has been shown that by selecting a particular clock wavetrain and applying it to the clock line $G_3$, successive signals may be summed. These summed signals may be transferred from register 300 through the output circuitry comprising transistors 324, 326, and 328.

In the operation of this output circuit, a bias voltage is applied to the source electrodes of transistors 324 and 326 such that these transistors will conduct linearly for applied gate potentials from V to 3V volts. Hence, in the absence of signals at nodes P4 and P5, either transistor 324 or 326 will be conducting in response to an applied gate potential of 3V volts, providing a quiescent output level at terminal 330. When a signal is provided, for example, at node P4 during the interval $t_{207}$ to $t_{208}$ as shown in FIG. 11, the potential applied to the gate electrode of transistor 324 will be less than 3V volts while that applied to the gate electrode of transistor 326 will be only V volts. The net effect of the lowered gate potentials on transistors 324 and 326 is a decrease in current flow through transistor 328 and consequent production of a video signal representative output voltage at terminal 330 that is different from the quiescent, no signal value.

Thus far, two applications of charge summing circuits have been shown for single line sensor arrays. It should be understood that application of charge summing techniques is not limited to only line sensors, but may be applied to a two-dimensional array in a manner to be described in conjunction with FIG. 12.

Figure 12:
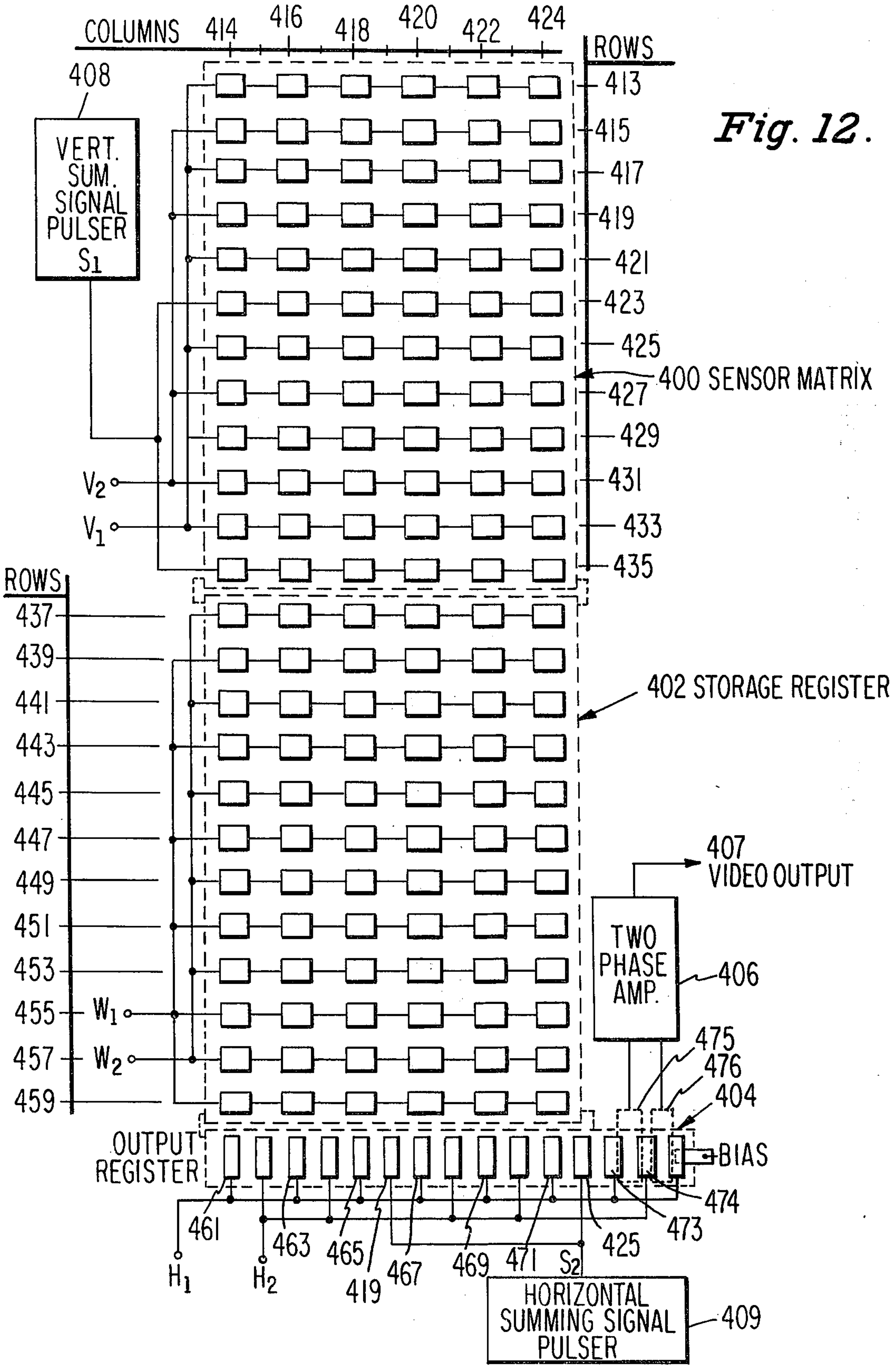
FIG. 12 is a schematic representation of a sensor matrix and registers embodying the invention.

FIG. 12 illustrates a matrix of light sensor regions 400 in which electrical signals produced in response to light stimuli may be summed to consolidate the constituent signals into groups composed of signals from adjacent horizontal, vertical, or horizontal and vertical elements.

A vertical summing signal pulser 408 is coupled to sensor matrix 400. Sensor matrix 400 and peripheral registers 402 and 404 are shown in a two-phase charge transfer configuration. For purposes of illustration, registers 402 and 404, and sensor matrix 400 will be understood to be of the two-phase bucket brigade type such as register 300 of FIG. 8. However, it should be understood that other types of charge transfer devices may be employed in this configuration.

The array 400 is illustrated schematically by six columns and 12 rows of rectangles. Each column may be considered a bucket brigade image sensing register which is operated by a two phase voltage $V_1$, $V_2$. A resolution element in such a register comprises two adjacent rectangles, such as those at 413 and 415 in row 414. (In a three phase charge transfer register, three adjacent rectangles would constitute a single resolution element). Thus, the array 400 can be considered to have a total of 6X6 or 36 resolution elements. Similarly, the storage register matrix 402 has 36 stages, where each stage consists of two adjacent rectangles in a column, one driven by one phase $W_1$ and the other by the phase $W_2$.

It will be shown in the detailed discussion which follows that within the matrix 400, the charge signal in each three resolution elements, such as in column 414, resolution elements (1) 413, 415; (2) 417, 419; (3) 421, 423, are first combined, and temporarily stored (in column 414, row 423 in this example). This reduces the number of charge signals from 36 to 12, where 6 of the combined charge signals become temporarily stored in row 423 and the other 6 become temprarily stored in row 435. When each group of such 6 signals reaches the output register 404, the contents of each group of three adjacent stages (where again two rectangles represent one stage) is combined (at 419 and 425 respectively). Thus, each group of six signals is reduced to two and since there are two such groups, this reduces to a total of four signals the 36 originally present in the matrix 400.

In the apparatus of FIG. 12, vertical summing signal pulser 408 is coupled to rows 423 and 435, which corresponds to every sixth row of sensor matrix 400. By applying an appropriate waveform to these rows 423, 435, such as the waveform $S_1$ shown in FIG. 13 and by applying clock signals $V_1$ and $V_2$ (FIG. 13) to the respective terminals $V_1$, $V_2$ of sensor matrix 400, charge may be transferred row by row from top to bottom of sensor matrix 400. Signals from sensor regions in rows 413, 415, 417, 419, 421 and from regions in rows 425, 427, 429, 431, and 433 are summed in the respective capacitive elements of rows 423 and 435. The charge transfer and signal summation process utilized in sensor matrix 400 is the same as the one described with respect to register 300 in FIG. 8. By summing signals in the sensor matrix itself, signals of increased amplitude may be produced prior to adding thereto noise signals associated with the remaining charge transfers necessary for the light representative signals to reach video output terminal 407.

Signals produced in sensor matrix 400 are shifted into storage register 402 during an interval of time substantially equal to a vertical retrace interval of a television scanning raster and are read out during a subsequent interval equal to the vertical trace interval of a television raster. To facilitate readout, information stored in register 402 is parallel shifted one row at a time into output register 404 wherein additional signal summing may be effected amongst the signals of each row. In this manner, signals of both horizontally and vertically adjacent elements may be summed together to form signals of further increased amplitude.

Figures 10, 13:
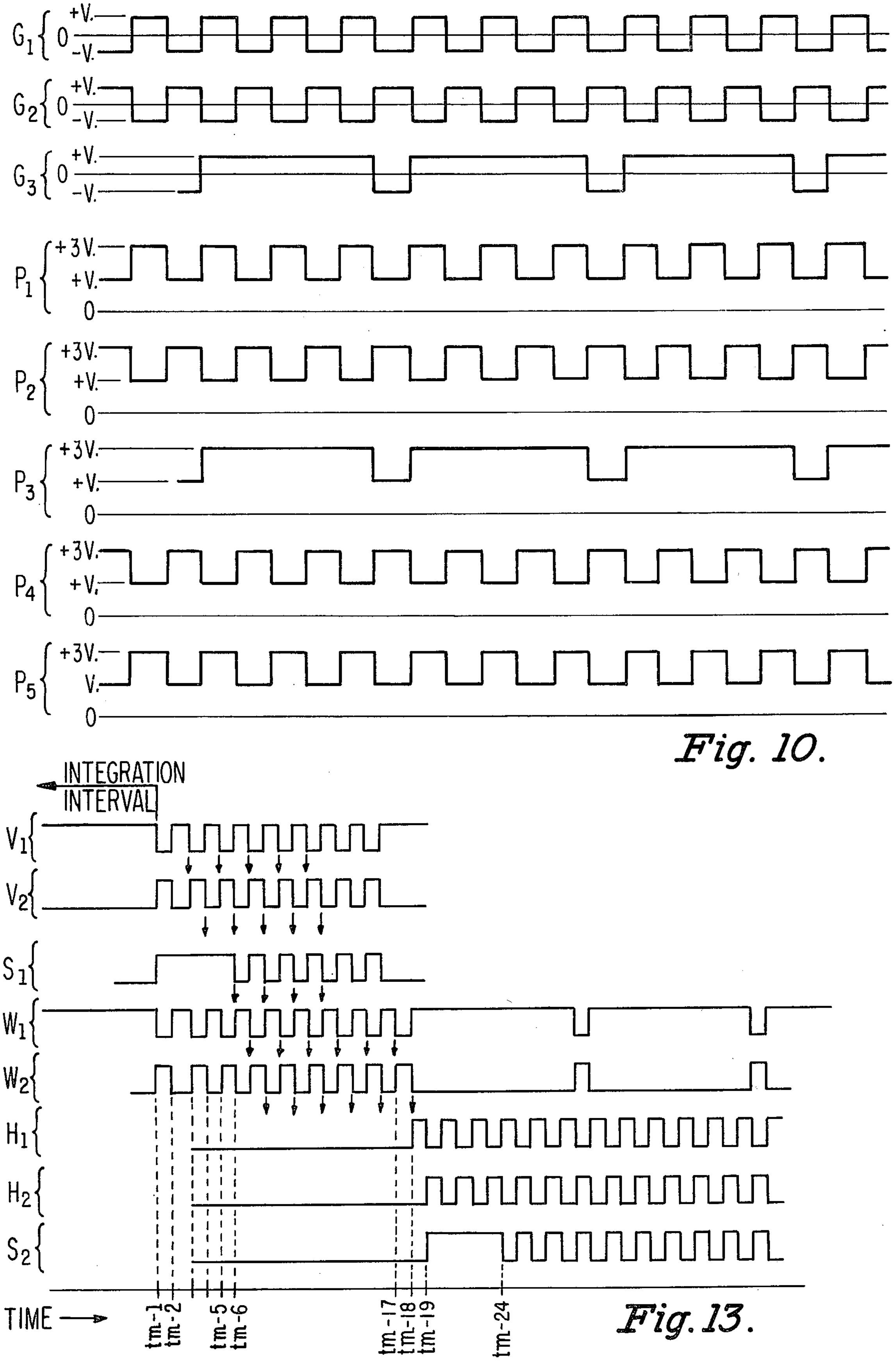
FIG. 10 illustrates potentials associated with nodes of the FIG. 8 circuitry in the absence of input signals.
FIG. 13 illustrates timing or clock signals associated with the circuitry of FIG. 12.

FIG. 13 illustrates clock voltage waveforms that, when applied to the apparatus shown in FIG. 12, will effectively combine signals associated with each nine sensor elements of sensor matrix 400. These nine elements will be formed from an area of the sensor array encompassed by three elements along a column by three elements across a row or one-fourth of the illustrated sensor area. Hence, after signal summation, four signals will be produced, each representative of one-fourth of the video informatin of sensor matrix 400.

Waveforms $V_1$, $V_2$ and $S_1$ shown in FIG. 13 represent the clock signals utilized to shift the lightrepresentative signals in sensor matrix 400 toward register 402. Wavetrain $S_1$ is produced at an output of vertical summing signal pulser 408 and is configured for summing lightrepresentative signals from each set of three adjacent elements in each of the columns of sensor matrix 400 prior to transfer of these signals to register 402. Wavetrains $W_1$ and $W_2$ are suitable for shiting sensor signals into storage register 402 and then transferring them at an equivalent television horizontal line scan rate into output register 404. Clock signals $H_1$, $H_2$ and $S_2$ are utilized to shift signals in output register 404 to two phase amplifier 406. Wavetrain $S_2$ is produced at an output terminal of horizontal summing signal pulser 409 and is arranged to operatively combine the signals shifted into columns 414, 416, and 418 and also combine the signals shifted into columns 420, 422 and 424 of register 404. The effect of vertically and horizontally combining reduces the number of resultant picture elements from 36 to 4.

In the operation of the apparatus of FIG. 12 and in response to the wavetrains of FIG. 13, signals representative of an illuminated scene are created during an integration interval prior to the time *tm*-1 (see FIG. 13). During this interval, corresponding in time to a vertical scan interval, wavetrain $V_1$ is high, allowing sensor matrix electrodes biased thereby to accumulate charge in response to light stimuli. Those sensor matrix electrodes coupled to the clock source $V_2$ do not accumulate charge in response to the light stimuli during the integration interval but rather-remain devoid of charge in preparation for receipt of same during the first charge transfer interval.

At a time *tm*-1, coincident with the start of a vertical retrace interval, light representative signals are shifted towards storage register 402. Arrows shown beneath wavetrains $V_1$, $V_2$ and $S_1$ (FIG. 13) indicate the time of a charge transfer down the columns of sensor matrix 400. If summing signal $S_1$ is adjusted to be identical to clock signal $V_2$, the charge transfer process would proceed as follows with no signal summation in the vertical direction. At time *tm*-1 the light representative charge associated with the sensor elements of rows 413, 417, 421, 425, 429 and 433 would be shifted down to the respective row beneath each of them. At time *tm*-2, rows 415, 419, 423, 427, 431 and 435 would now contain light representative charge received at time *tm*-1 and would shift this charge to the respective row beneath each of them. This process would continue for ten more charge transfers until all the charge was transferred from sensor matrix 400 to register 402.

To effect summation of signals from three successive elements in each of the columns, summing signal pulser 408 is adjusted to provide wavetrain $S_1$ as shown in FIG. 13. Wavetrain $S_1$ operates upon rows 423 and 435 of sensor matrix 400 to provide a maximum voltage to these rows during the interval of *tm*-1 through *tm*-6. Application of this maximum voltage to a sensor element for a given interval will allow that element to receive transferred charge over the entire interval. During the interval *tm*-1 through *tm*-5, (see FIG. 13), five charge transfers occur in sensor matrix 400 as depicted by the five arrows shown under wavetrains $V_1$ and $V_2$ during this interval. The five charge transfers effect successive shifting of light responsive charge in elements of rows 413, 417 and 421 into the elements of row 423 and concurrently the successive shifting of light responsive charge in the elements of rows 425, 429 and 433 into the elements of row 435. Light responsive charge in the elements of rows 423 and 435 now represent the sum of the light responsive charge transferred through the respective five preceding rows. At time *tm*-6, the summed charges in rows 423 and 435 are transferred to the respective rows beneath each of them (425 and 437). This shift process continues thereafter in a regular manner shifting the two rows of summed charge into register 402.

Clock signals $W_1$ and $W_2$ are applied to respective terminals $W_1$ and $W_2$ on register 402. These clock signals effect transfer of charge from sensor matrix 400 into register 402 during a period of time equivalent to a vertical retrace interval of a television scanning raster and transfer of this same charge one line at a time into output register 404 during a period of time equivalent to a horizontal retrace interval of a television scanning raster. The 12 arrows beneath wavetrains $W_1$ and $W_2$ in the interval *tm*-1 to *tm*-8 (see FIG. 13) indicate the 12 transfers necessary to shift charge through register 402 and place the charge from sensor row 435 into output register 404.

At time *tm*-17 the summed charge transferred from row 435 of sensor matrix 400 at time *tm*-6 arrives in row 459 of register 402. This row of charge is then transferred from row 459 of register 402 into output register 404 at time tm-18, wherein sequential video readout at terminal 407 is provided. Wavetrains $H_1$, $H_2$ and $S_2$ are applied to respective terminals $H_1$, $H_2$ and $S_2$ of register 404 and effect a sequential shift of the charge representative video signals to output amplifier 406. A horizontal summing signal pulser 409 interposed in register 404 in the same manner as summing signal pulser 408 in sensor matrix 400 is operative to effect summation of light representative charge in register 404. The charge transferred into register 404 is summed in groups of three to form two summed signals. Each of these two summed signals now contains the light representative charge from nine elements of sensor matrix 400.

Wavetrain $S_2$, produced by summing signal generator 409 and depicted in FIG. 13, provides a maximum signal to elements 419 and 425 during the interval *tm*-19 to *tm*-24. Concurrently during the same interval of time light representative charge located in elements 461, 463, and 465 are transferred and summed in element 419, while the light responsive charge in elements 467, 469 and 471 are transferred and summed in element 425.

At time *tm*-24 the accumulated charge in elements 419 and 425 are transferred to their respective succeeding elements 467 and 473. A succession of charge transfers thereafter occurs transferring the two packets of summed charge to elements 473 and 474 wherein electrodes 475 and 476 beneath these elements couple the summed charge to amplifier 406. Amplifier 406 is similar to the one composed of transistors 324, 326 and 328 and shown in FIG. 8. A video output signal from amplifier 406 is provided at terminal 407 and appears as four discrete signal amplitudes per field representative of the scanned image.

Although the apparatus of FIG. 12 has been shown to operate with bucket brigade charge transfer devices and transfer charge in specific directions, it should be understood that other types of charge transfer devices may also be employed as well as other apparatus arrangements requiring charge transfer in other directions. For example, the apparatus of FIG. 12 could be rearranged to require charge transfer across the rows of sensor matrix 400 rather than down the columns and likewise the direction of charge transfer in registers 402 and 404 could be similarly rearranged.

Connection of the vertical and horizontal summing signal pulsers are not limited to respective placement in the sensor matrix and output register shown in FIG. 12. Other combinations of pulser connections are possible depending upon the particular quantity of signals to be combined. For example, if summing signal pulsers 408 and 409 were respectively connected to every eight electrode of sensor matrix 400 and register 404 instead of every sixth as shown, the signals could be summed in groups of either one, four, or 16 elements depending upon the waveforms applied by the respective summing signal pulsers.

Thus far it has been shown that signals from elements of a light sensing matrix may be combined in a regular or symmetrical fashion to effect an increased signal-to-noise ratio at the expense of resolution. Here, the reduced resolution occurs from the reduced number of output signals produced after combining.

If output circuitry such as that shown in FIG. 8 is utilized with the circuitry of FIG. 12, the reduced number of output signals may be widely separated on the display providing what may appear to be an undesirable effect. This undesirable effect may be reduced. For example, the discrete video signal may be stretched by utilizing sample and hold circuitry to coordinate stretching of these video signals in both horizontal and vertical directions, and thereby reducing dark areas between the discrete signals.

Another means for filling in the voids between the discrete video output signals is to interlace the video signals during successive frames. This technique could be implemented by alternating the phase of the summing voltages in the successive fields. By utilizing this technique it is possible to reduce the resolution loss from the combining process since the interlaced video signals would be composed of combinations of signals from different sensor matrix elements than those combined in the preceding frame, thereby providing new video information.

Other techniques for smoothing the signals after summing may be implemented by techniques as simple as defocusing the display device or reducing the size of the display raster. Anyone of these techniques will provide a more homogeneous display and descrease the effects of the smaller quantity of video signals.

Although it has been shown that an increased signal-to-noise ratio may be effected by uniformly combining signals from sensor elements, it should be understood that the scope of this invention goes beyond that heretofore described. For example, by arranging the apparatus of FIG. 12 to have programable clock generators coupled to predetermined rows and columns, it would be possible to combine signals from only a selected area of the sensor matrix. The ability to combine signals of only a selected area would afford an operator of this apparatus the ability to enhance the signal levels in dark or shadowed areas of an illuminated scene without decreasing the resolution in those areas of the scene that have been adequately illuminated.

What is claimed is:

1. A circuit for increasing the amplitude of signals produced in response to radiant energy excitation comprising, in combination;

a radiant energy sensing array including a plurality of locations, each defining one resolution element of the array, each location responsive to radiant energy excitation for producing a charge signal, and each location including means for storing its charge signal; and means for combining the charge signal stored at groups of *n* adjacent locations, to provide a plurality of combined signals, fewer in number than the charge signals produced by the array, but each combined signal of greater amplitude than the individual ones of its constituent parts, where *n* is an integer greater than 1.

2. A circuit as set forth in claim 1, wherein said array comprises a charge-coupled device array.

3. A circuit as set forth in claim 1, wherein said array comprises a bucket-brigade array.

4. A circuit as set forth in claim 1 wherein said array comprises a plurality of columns and rows of locations, and wherein said means for combining comprise means for combining the contents of each group of *p* adjacent rows and *q* adjacent columns, where $p \times q = n$, and *p* and *q* are both integers greater than 1.

5. A circuit as set forth in claim 1 wherein said array comprises a plurality of columns and rows of locations, and wherein said means for combining is internal of said array and comprises means for shifting the signals present in each group of *n* adjacent locations along a column into the *n*'th location of that group and in that column, whereby after the shifting process, combined charge signals are present at the locations along each n'th row of the array.

6. A circuit as set forth in claim 5, further including:

a register having the same number of stages as there are locations in a row;

means for shifting the contents of each said *n*'th row of said array into said register, one row at a time; and means, during the time a row of information is present in said register, for shifting the contents of each group of *m* adjacent stages in said register into the *m*'th stage, whereby upon the completion of this shifting process, each *m*'th stage of the register contains the contents of the *m* adjacent stages of the register, where *m* is an integer greater than 1.

7. In combination:

an image sensing array including at least a row of $m \times n$ image sensing locations, each location comprising one resolution element of the array, each location for producing and storing a charge signal in response to radiant energy excitation; and means for combining the charge signal present at each *n* adjacent locations along said row to provide *m* charge signals, each of an amplitude substantially equal to the sum of the *n* signals combined to produce that charge signal and, in the process, reducing the resolution along said row by a factor of $n$, where $n$ is an integer greater than 1 and $m$ is an integer.

8. In the combination as set forth in claim 7, said means for combining comprising a signal storage register, means for sequentially shifting the charge signals stored in each $n$ adjacent locations said row of said array into the first stage of said register; and means for sequentially shifting the signals stored in said register out of said register at a rate $1/n$'th times that of the shifting of the charge signal out of said row.

9. In the combination as set forth in claim 8, said row and said register each comprising a plurality of charge transfer elements.

* * * * *